United States Patent
Seimiya

(10) Patent No.: US 9,586,498 B2
(45) Date of Patent: Mar. 7, 2017

(54) BATTERY FOR WORK VEHICLE AND BATTERY-TYPE WORK VEHICLE

(71) Applicant: Komatsu Ltd., Tokyo (JP)

(72) Inventor: Shigeru Seimiya, Oyama (JP)

(73) Assignee: Komatsu Ltd., Tokyo (JP)

( * ) Notice: Subject to any disclaimer, the term of this patent is extended or adjusted under 35 U.S.C. 154(b) by 541 days.

(21) Appl. No.: 14/124,391

(22) PCT Filed: Aug. 2, 2013

(86) PCT No.: PCT/JP2013/071067
§ 371 (c)(1),
(2) Date: Dec. 6, 2013

(87) PCT Pub. No.: WO2015/015649
PCT Pub. Date: Feb. 5, 2015

(65) Prior Publication Data
US 2015/0217659 A1    Aug. 6, 2015

(51) Int. Cl.
*B60L 11/18* (2006.01)
*H01M 2/10* (2006.01)
(Continued)

(52) U.S. Cl.
CPC ............ *B60L 11/1874* (2013.01); *B60K 1/04* (2013.01); *B60L 11/1816* (2013.01);
(Continued)

(58) Field of Classification Search
CPC ............. H01M 2/1083; H01M 10/613; H01M 10/625; H01M 10/6554; H01M 10/6555;
(Continued)

(56) References Cited

U.S. PATENT DOCUMENTS

| 4,047,750 A | 9/1977 | Samide |
| 6,085,854 A | 7/2000 | Nishikawa |

(Continued)

FOREIGN PATENT DOCUMENTS

| CN | 202434584 U | 9/2012 |
| DE | 3126594 A1 | 4/1982 |

(Continued)

OTHER PUBLICATIONS

International Search Report dated Aug. 27, 2013, issued for PCT/JP2013/071067.

*Primary Examiner* — Eugenia Wang
(74) *Attorney, Agent, or Firm* — Locke Lord LLP

(57) ABSTRACT

A battery that supplies electric power to a battery-driven work vehicle, includes: battery cells; a casing including storing the battery cells in a space surrounded by the top, the bottom, and the sides thereof; an inlet hole open to the side to introduce a gas into the casing; an outlet hole open to a side facing the side to which the inlet hole is open, and discharging the gas from an inside of the casing; and a fan introducing the gas from the inlet hole into the casing to make the gas flow in contact with the top and bottom surfaces of the battery cells, and then discharging the gas from the inside the casing, wherein the casing includes rod-shaped members extended from the inlet hole to the outlet hole, and wherein the rod-shaped members come in contact with the bottom surface of the battery cell.

9 Claims, 9 Drawing Sheets

(51) Int. Cl.
*H01M 10/658* (2014.01)
*H01M 10/613* (2014.01)
*H01M 10/625* (2014.01)
*B60K 1/04* (2006.01)
*H01M 10/42* (2006.01)
*H01M 10/6554* (2014.01)
*H01M 10/6555* (2014.01)
*H01M 10/6556* (2014.01)
*B60K 1/00* (2006.01)
*B60K 11/06* (2006.01)
*H01M 10/6566* (2014.01)
*H01M 10/6563* (2014.01)

(52) U.S. Cl.
CPC ....... *H01M 2/1077* (2013.01); *H01M 2/1083* (2013.01); *H01M 10/613* (2015.04); *H01M 10/625* (2015.04); *H01M 10/658* (2015.04); *H01M 10/6555* (2015.04); *H01M 10/6563* (2015.04); *H01M 10/6566* (2015.04); *B60K 11/06* (2013.01); *B60K 2001/005* (2013.01); *B60K 2001/0422* (2013.01); *B60Y 2200/15* (2013.01); *H01M 10/425* (2013.01); *H01M 10/6554* (2015.04); *H01M 2200/103* (2013.01); *H01M 2220/20* (2013.01)

(58) Field of Classification Search
CPC ......... H01M 10/6564; H01M 10/6566; H01M 2220/20; H01M 2/1077; H01M 10/658; H01M 10/6563; H01M 10/425; H01M 2200/103; B60L 11/1874; B60L 11/1816; B60L 11/06; B60K 1/104; B60K 2200/15; B60K 2001/0422; B60K 2001/005
See application file for complete search history.

(56) References Cited

U.S. PATENT DOCUMENTS

| | | | |
|---|---|---|---|
| 6,094,927 A | 8/2000 | Anazawa et al. | |
| 2004/0188192 A1* | 9/2004 | Kidokoro | B60N 2/24 188/109 |
| 2008/0076011 A1* | 3/2008 | Emori | B60L 3/0046 429/62 |
| 2009/0141447 A1 | 6/2009 | Soma et al. | |
| 2009/0183935 A1 | 7/2009 | Tsuchiya | |
| 2010/0059299 A1* | 3/2010 | Hoermandinger | B60K 6/28 180/65.21 |
| 2011/0104548 A1* | 5/2011 | Saito | H01M 2/1072 429/120 |
| 2012/0040228 A1* | 2/2012 | Heidenbauer | H01M 2/1077 429/120 |

FOREIGN PATENT DOCUMENTS

| | | |
|---|---|---|
| GB | 2081495 A | 2/1982 |
| JP | 11-180168 A | 7/1999 |
| JP | 2009-211829 A | 9/2009 |
| JP | 2009-277354 A | 11/2009 |
| JP | 2011-096398 A | 5/2011 |
| JP | 2012-133890 A | 7/2012 |
| JP | 2013-097891 A | 5/2013 |
| WO | WO-2013/061132 A2 | 5/2013 |

* cited by examiner

BATTERY FOR WORK VEHICLE AND BATTERY-TYPE WORK VEHICLE

FIELD

The present invention relates to a battery for a work vehicle and a battery-type work vehicle on which the battery is mounted.

BACKGROUND

For example, there is known a work vehicle which includes motors mounted thereon for a running operation and batteries for supplying electric power to the motors to cause the motors to run. Since these batteries used in such a work vehicle generate heat during a charging operation, the batteries need to be cooled. For example, Patent Literature 1 discloses a technology of cooling batteries mounted on a vehicle.

CITATION LIST

Patent Literature

Patent Literature 1: Japanese Laid-open Patent Publication No. 11-180168

SUMMARY

Technical Problem

In the technology disclosed in Patent Literature 1, a plurality of batteries are arranged in a gap and cooled down by a cooling air passing the gap from top to bottom. Therefore, an increase in dimension of the whole batteries is incurred, and thus there is a possibility to cause an increase in dimension of a work vehicle with the battery pack built therein. In a case where there is no cooling air passage for suppressing the increase in dimension of the battery pack, the battery pack may not be sufficiently cooled down.

An object of the invention is to securely cool down the battery for the work vehicle while suppressing the increase in dimension of the battery built in the battery-driven work vehicle.

Solution to Problem

According to the present invention, a battery that supplies electric power to a battery-driven work vehicle, the battery comprises: a plurality of battery cells; a battery casing which includes a bottom, a top facing the bottom, and sides connecting the bottom and the top, and stores the plurality of battery cells in a space surrounded by the top, the bottom, and the sides; an inlet hole which is open to the side to introduce a gas into the battery casing; an outlet hole which is open to a side facing the side to which the inlet hole is open, and discharges the gas from an inside of the battery casing; and a fan which introduces the gas from the inlet hole into the battery casing to make the gas flow in contact with the top and bottom surfaces of the plurality of battery cells, and then discharges the gas from the inside the battery casing, wherein the battery casing includes a plurality of rod-shaped members which are extended from the inlet hole to the outlet hole, and wherein the rod-shaped members come in contact with the bottom surface of the battery cell.

In the present invention, it is preferable that the battery casing includes a partition member between the top and the bottom to partition the inside of the battery casing, wherein the plurality of battery cells are disposed between the top and the partition member and between the partition member and the bottom, respectively and wherein the gas introduced from the inlet hole into the battery casing flows in contact with the top and bottom surfaces of the battery cell disposed between the top and the partition member, and in contact with the top and bottom surfaces of the battery cell disposed between the partition member and the bottom.

In the present invention, it is preferable that a heat insulating material is provided between the side of the battery casing and the battery cell.

In the present invention, it is preferable that the fan is provided on a side of the outlet hole, and sucks the gas from the inside of the battery casing during at least a period when the plurality of battery calls are charged.

In the present invention, it is preferable that the fan sucks the gas from the inside of the battery casing even during a period when the plurality of battery cells are discharged.

In the present invention, it is preferable that the battery for the work vehicle further comprises a storage case which is provided on an outside of the top of the battery casing to store a fuse which is electrically connected with the battery cell.

According to the present invention, a battery-type work vehicle comprises the battery for the work vehicle.

In the present invention, it is preferable that the inlet hole is disposed on one side of the battery-type work vehicle in a width direction, and wherein the outlet hole is disposed on the other side thereof in the width direction.

In the present invention, it is preferable that the battery for the work vehicle is disposed under a battery hood of the battery-type work vehicle.

In the present invention, it is preferable that the battery hood rotates about a predetermined shaft in a front of the battery-driven work vehicle, and wherein a storage case which is provided on an outside of the top of the battery casing to store the fuse which is electrically connected to the terminal is provided on a back side of the battery-type work vehicle.

According to the invention, the cooling of the battery for the work vehicle can be secured while suppressing the increase in dimension of the battery built in the battery-driven work vehicle.

DESCRIPTION OF EMBODIMENTS

Modes (embodiments) for carrying out the invention will be described in detail with reference to the drawings.

Figure 1:
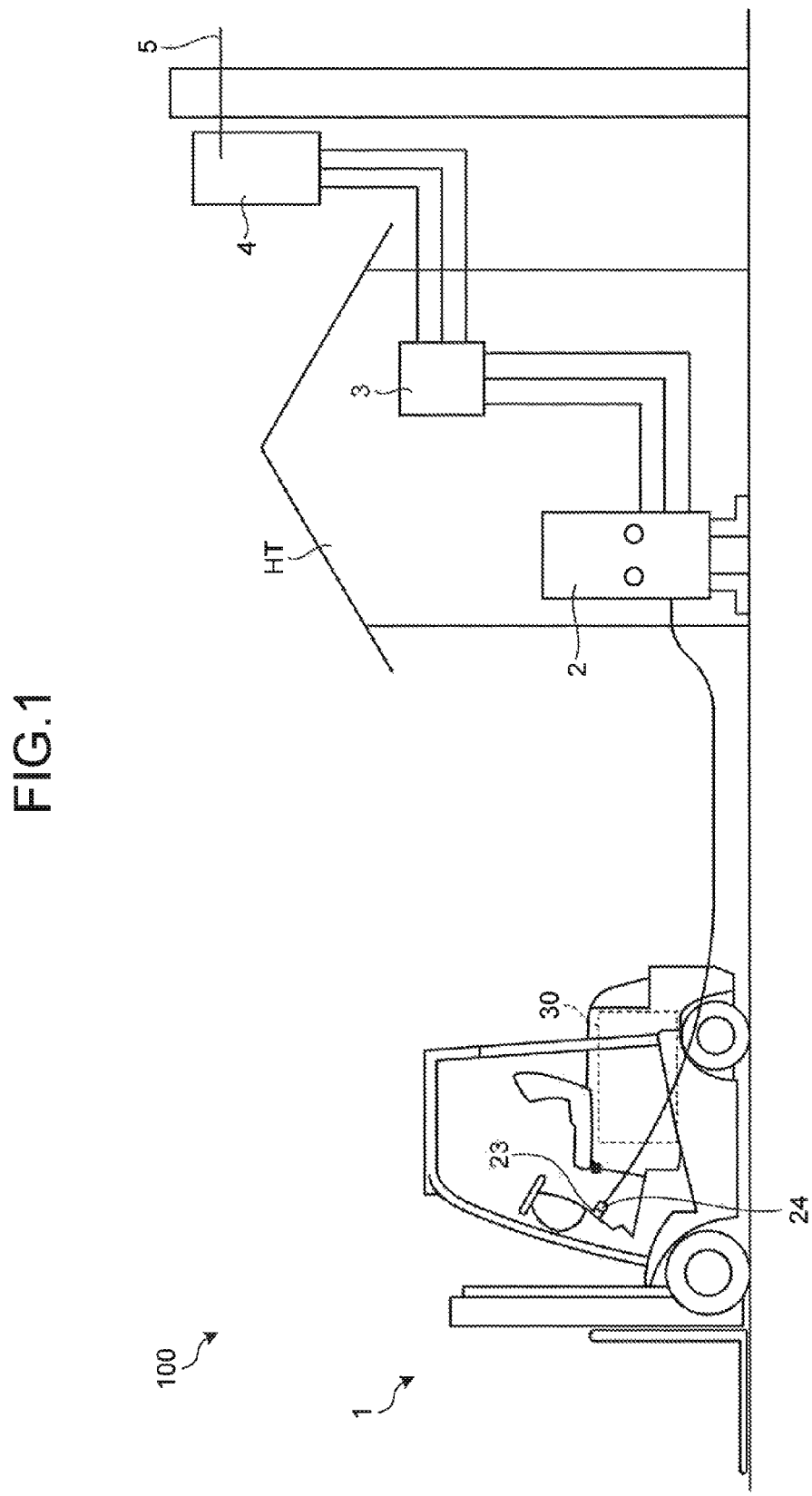
FIG. 1 is a diagram illustrating a work vehicle charging system according to an embodiment.

FIG. 1 is a diagram illustrating a work vehicle charging system according to an embodiment. In the embodiment, a battery-type forklift 1 will be described as an example of a work vehicle, but the work vehicle is not limited thereto. For example, the work vehicle may be a wheel loader or an excavator which is driven by electric power from the battery or electric power obtained from a motor driven by such as an engine.

A work vehicle charging system 100 includes the battery-type forklift 1 and a charging apparatus 2. The battery-type forklift 1 is a battery-type work vehicle which is provided with a battery 30 as a battery for work vehicle and at least one motor driven by electric power supplied from the battery 30. The at least one motor is, for example, a motor which causes the battery-type forklift 1 to run. The charging apparatus 2 is a stationary apparatus which is provided in a building HT or the eaves or the like of the building HT. The charging apparatus 2 is supplied with 3-phase AC power from a power distribution panel 3 in the building HT. The power distribution panel 3 is supplied with the AC power from, for example, a pole-mounted transformer 4. The pole-mounted transformer 4 is supplied with the AC power through an electric power line 5 from an electric power substation. For example, a charging connector 23 of the battery-type forklift 1 is connected to a charging-apparatus-side connector 24 of the charging apparatus 2 during a rest period for the charging of the battery 30. In a case of using the rest period, the battery 30 may be charged in a boost mode.

Figure 2:
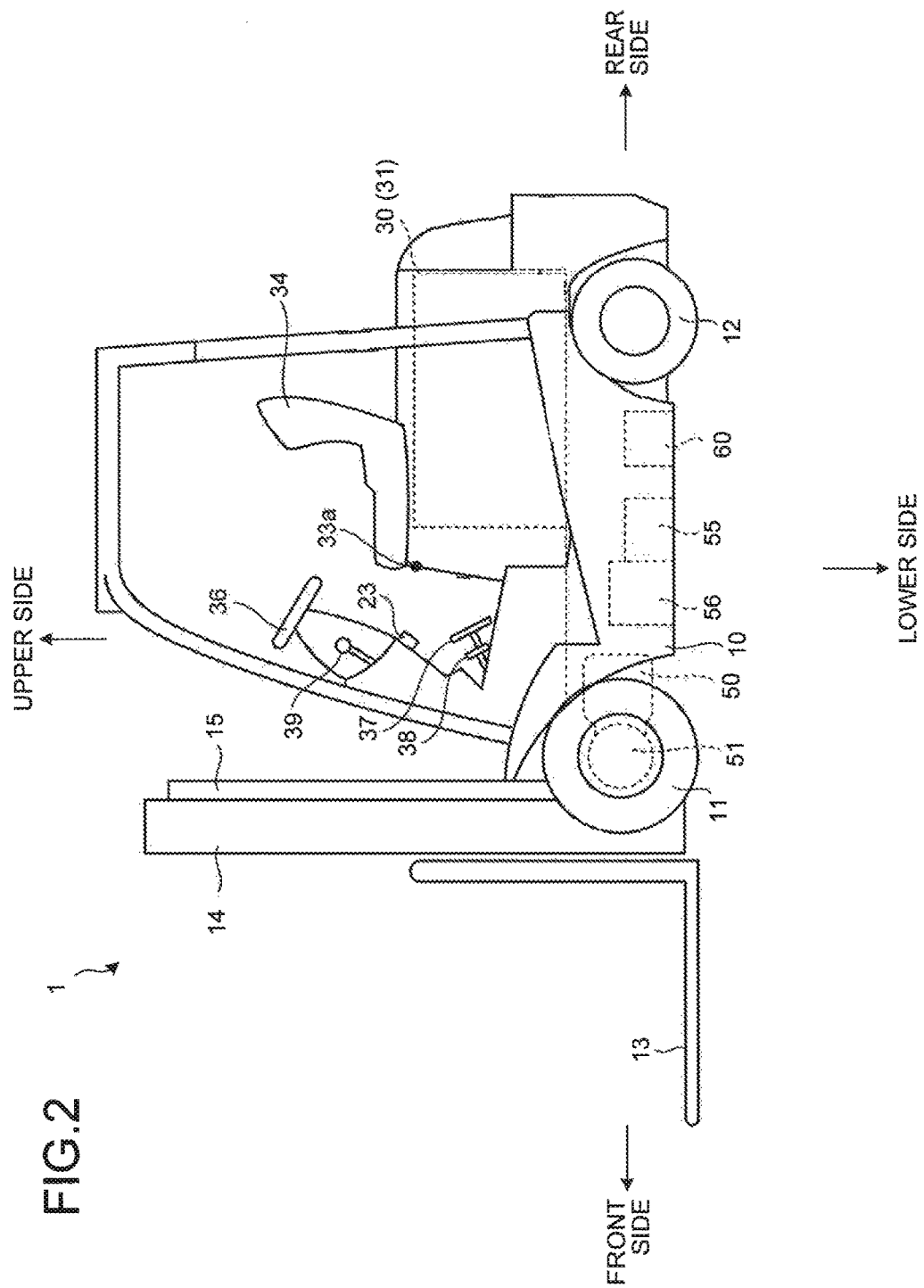
FIG. 2 is a side view illustrating a state of a battery-type forklift according to the embodiment seen from the left side.
Figure 3:
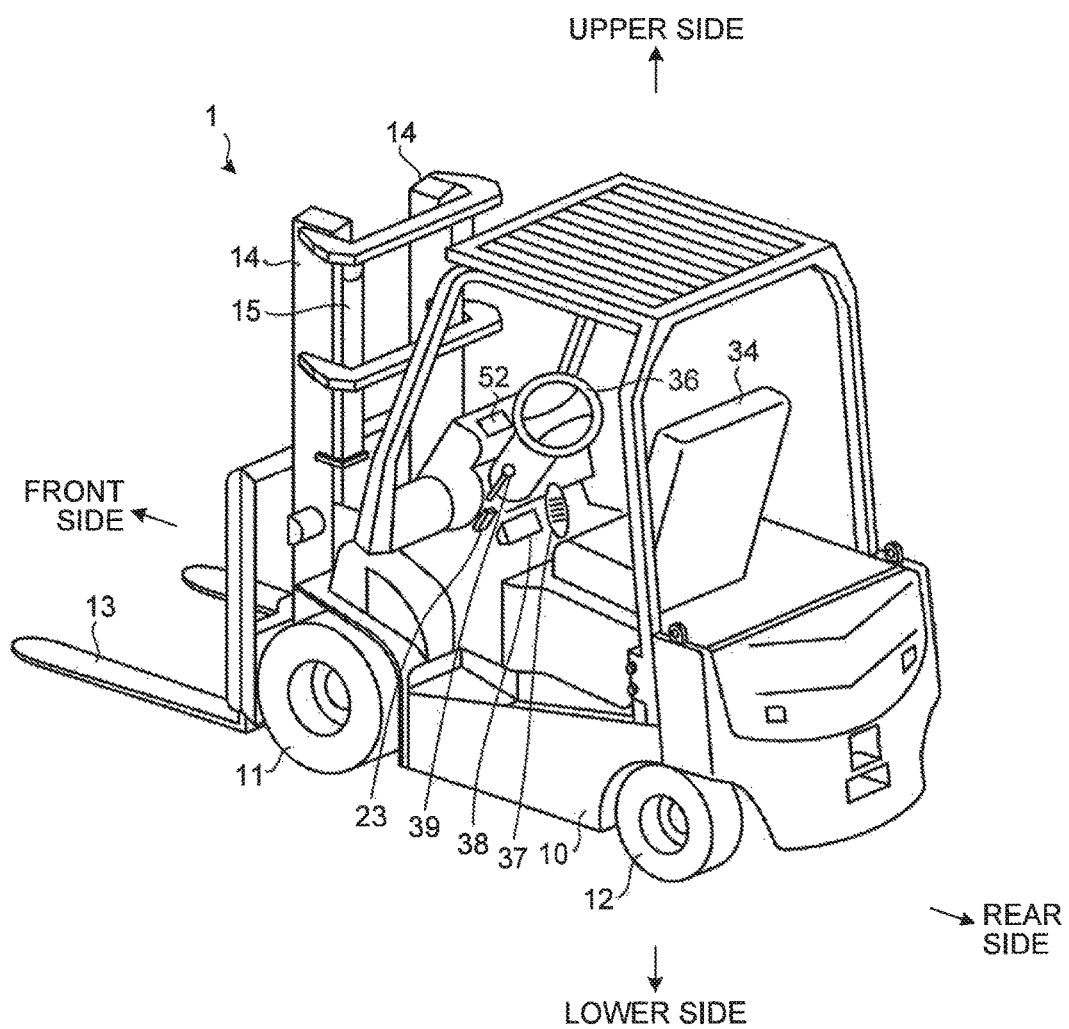
FIG. 3 is a perspective view illustrating a state of the battery-type forklift according to the embodiment obliquely seen from the rear left upper side.

FIG. 2 is a side view illustrating a state of the battery-type forklift according to the embodiment seen from the left side. FIG. 3 is a perspective view illustrating a state of the battery-type forklift according to the embodiment obliquely seen from a left upper side. In the following description, the front of the battery-type forklift 1 is on the side where a fork 13 is provided, and the rear thereof is on the side where a counterweight 20 is provided. When the work vehicle is not the battery-type forklift, the front is on the side facing from a driver seat 34 to a handle 36 as an operating device, and the rear is on the side facing from the handle 36 to the driver seat 34. Besides the handle 36 used for steering the work vehicle, examples of the operating device also include operating levers which are used for operating working machines in the excavator or the wheel loader, or the like.

In the embodiment, a right and left side means a right and left side with respect to the front. A right and left direction means a width direction of a vehicle body 10 as the main body of the work vehicle. An upper side is on the side perpendicular to a plane (ground plane) where at least three of front wheels 11 and rear wheels 12 are brought in contact, facing from the ground plane to a rotation center axis of the front wheels 11 or the rear wheels 12. A lower side is on the side facing from the rotation center axis of the front wheels 11 or the rear wheels 12 to the ground plane. An axis which is arranged along the vehicle body 10 in a front and rear direction and passes through the center of the vehicle body 10 in the width direction will be referred to as a front and rear axis; an axis which is arranged perpendicular to the front and rear axis, parallel to the installation plane, and along the vehicle body 10 in the right and left direction will be referred to as a right and left axis. An axis of the vehicle body 10 in an upper and lower direction will be referred to as an upper and lower axis. The upper and lower axis is perpendicular to both of the front and rear axis and the right and left axis. In the following, it is assumed that the expression "in plan view" refers to a state viewed from the upper side.

<Overall Configuration of Battery-Type Forklift 1>

The battery-type forklift 1 is provided with the front wheel 11 in each of the corner portions of the front of the vehicle body 10, and the rear wheel 12 in each of the corner portion of the rear of the vehicle body 10. A motor for a running operation (a running motor) 50 which is provided in the rear of the front wheels 11 drives the front wheels 11, and thus the battery-type forklift 1 runs. More specifically, the output of the running motor 50 is transferred to both the front wheels 11 and 11 through a power transmission device 51 which has a decelerating function, and thus the front wheels are driven.

In the embodiment, as the running motor 50, there may be used, for example, a PM (Permanent Magnet) motor, that is, a motor having a permanent magnet as a rotor. When the PM motor is used as the running motor 50, it may be in an SPM (Surface Permanent Magnet) type or an IPM (Interior Permanent Magnet) type.

In the front of the vehicle body 10, there is provided a fork 13 which is used for loading/unloading or moving cargoes. The fork 13 is supported to a mast 14 which is provided in the upper and lower direction. The fork 13 moves up and down along the mast 14 while a mast cylinder 15 provided in the mast 14 is driven. While not illustrated in the drawing, the mast 14 is rotatably attached to the vehicle body 10 about each axis on the right and left side at the lower end thereof. Further, the mast 14 is provided with a tilt cylinder (not illustrated) between the mast and the vehicle body 10. The mast 14 can be in a forward or backward tilted posture with respect to the vehicle body 10 by driving the tilt cylinder.

At the trailing edge of the vehicle body 10, the counterweight 20 is provided. As described above, the battery-type forklift 1 is a counterbalance forklift, but not limited thereto. The counterweight 20 is a weight for taking a balance in a case where the fork 13 supports a cargo. For example, the counterweight 20 is made of metal, but not limited thereto. The counterweight 20 is disposed on a portion ranging from the top of the rear wheels 12 to the rear edge of the vehicle body 10.

The battery-type forklift 1 is provided with an accelerator pedal 37, a brake pedal 38, and an advancing direction switching lever 39. The accelerator pedal 37 is an operation member to control an output and a rotational direction of the running motor 50. The brake pedal 38 is an operation member to stop the battery-type forklift 1. The advancing direction switching lever 39 is an operation member to switch the advancing direction of the battery-type forklift 1 to any one of the forward direction and the backward direction. The battery-type forklift 1 is provided with the charging connector 23. The charging connector 23 is connected to the charging-apparatus-side connector 24 of the charging apparatus 2 illustrated in FIG. 1 while the battery 30 is charged. The charging connector 23 is attached with a cover for preventing water when the charging-apparatus-side connector 24 is not connected.

As illustrated in FIG. 3, the battery-type forklift 1 is provided with a display panel 52 as a display device on the front of the handle 36. The display panel 52 includes an input unit through which various settings are made with respect to the battery-type forklift 1, and a display unit on which information on states of the battery-type forklift 1 is displayed. An operator of the battery-type forklift 1 makes various settings with respect to the battery-type forklift 1 through the display panel 52. Examples of the information on the states of the battery-type forklift 1 which is displayed in the display unit of the display panel 52 include the states of the battery 30 or the hydraulic pressures of working fluids supplied to the mast cylinder 15 and the like. The working fluid is supplied from a hydraulic pump 56 which is driven by a cargo-handling motor 55. An in-vehicle controller 60 controls the running motor 50 and the cargo-handling motor 55.

<Structure of Battery 30>

Figure 4:
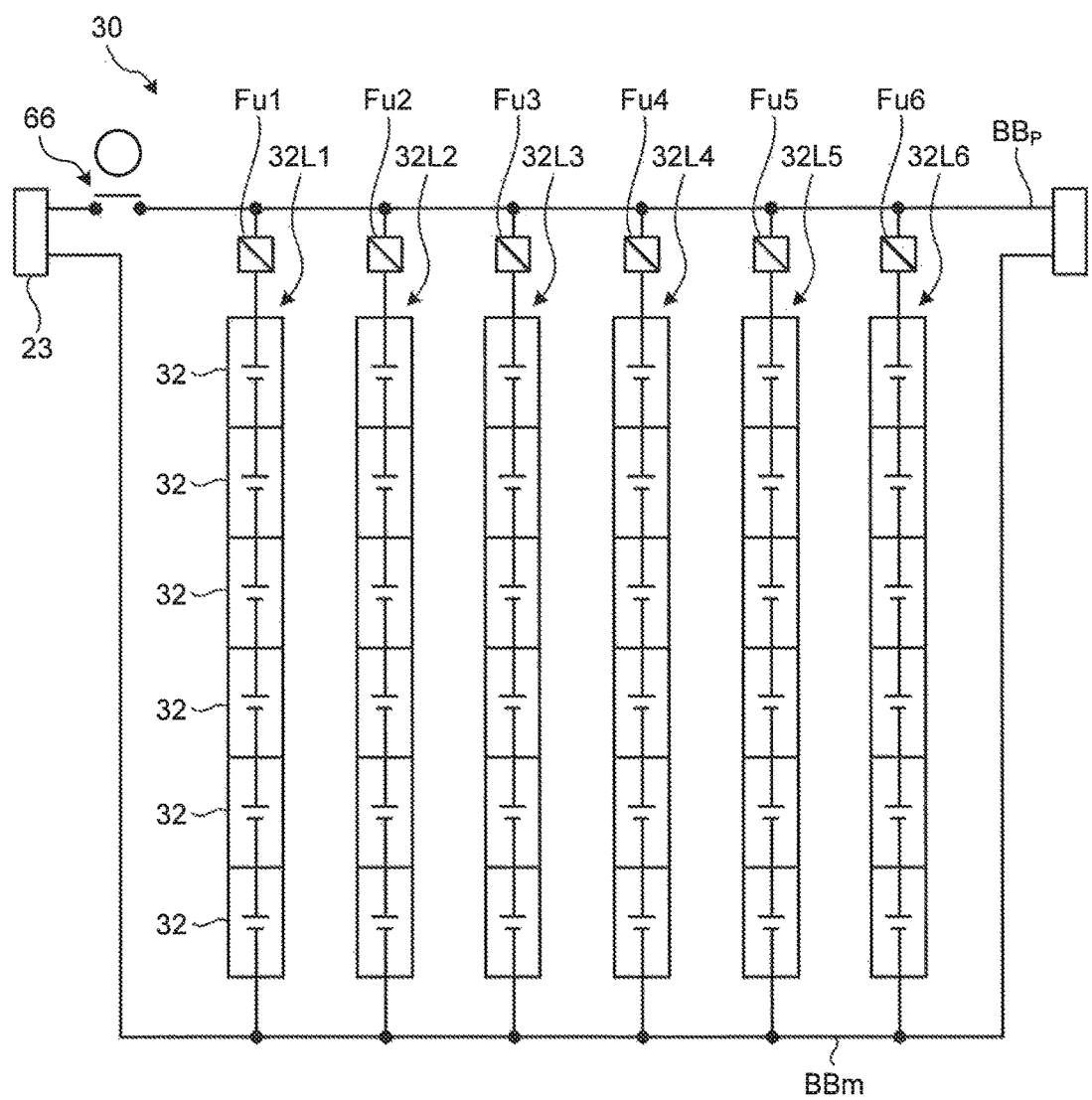
FIG. 4 is a diagram illustrating a battery which is provided in the battery-type forklift according to the embodiment.

FIG. 4 is a diagram illustrating a battery which is provided in the battery-type forklift according to the embodiment. The battery 30 is provided with a plurality of battery cells 32. In the embodiment, the battery cell 32 is a control valve type battery (for example, a lead battery). Such a battery cell 32 is suitable for a boost charge. Each battery cell 32 has a voltage of 12 V between terminals. In the embodiment, the plurality (six in this case) of battery cells 32 are connected in series to form battery cell groups (six in this case) 32L1, 32L2, 32L3, 32L4, 32L5, and 32L6. Then, the respective battery cell groups 32L1, 32L2, 32L3, 32L4, 32L5, and 32L6, are connected in parallel using, for example, copper bus-bars BBp and BBm. In this way, the battery 30 is a parallel battery pack which is configured by the plurality of battery cell groups 32L1, 32L2, 32L3, 32L4, 32L5, and 32L6 connected in parallel.

The bus-bar BBm electrically connects the negative electrode terminals of the respective battery cell groups 32L1, 32L2, 32L3, 32L4, 32L5, and 32L6. The bus-bar BBp electrically connects the positive electrode terminals of the respective battery cell groups 32L1, 32L2, 32L3, 32L4, 32L5, and 32L6. Between the bus-bar BBp and the respective battery cell groups 32L1, 32L2, 32L3, 32L4, 32L5, and 32L6, there are fuses Fu1, Fu2, Fu3, Fu4, Fu5, and Fu6 connected therebetween. In other words, the terminals of the battery cells 32 provided in each of the battery cell groups 32L1, 32L2, 32L3, 32L4, 32L5, and 32L6 are connected to the fuses Fu1, Fu2, Fu3, Fu4, Fu5, and Fu6. The bus-bar BBm and the bus-bar BBp are attached to the charging connector 23. Between the bus-bar BBp and the charging connector 23, there is provided a contactor 66.

Since the battery 30 is configured in a parallel battery pack, when a variation in temperatures of the respective battery cell groups 32L1, 32L2, 32L3, 32L4, 32L5, and 32L6 occurs, the internal resistance of a high-temperature battery cell 32 is lowered and the current is easily flows. As a result, there may cause a variation of the charging rates of the respective battery cell groups 32L1, 32L2, 32L3, 32L4, 32L5, and 32L6 or a decrease in durability of the battery cell 32. In general, the variation of the charging rates and the decrease in durability are suppressed by controlling the current flowing in the respective battery cell groups 32L1, 32L2, 32L3, 32L4, 32L5, and 32L6 at the time of charging.

In the embodiment, total lengths from the bus-bar BBp to the bus-bar BBm are equal in the respective battery cell groups 32L1, 32L2, 32L3, 32L4, 32L5, and 32L6. In this way, since the variation in resistance of the respective battery cell groups 32L1, 32L2, 32L3, 32L4, 32L5, and 32L6 can be suppressed, the variation in temperatures of the respective battery cell groups 32L1, 32L2, 32L3, 32L4, 32L5, and 32L6 can be suppressed. As a result, even though the in-vehicle controller 60 (see FIG. 2) provided in the battery-type forklift 1 does not individually control the currents flowing into the respective battery cell groups 32L1, 32L2, 32L3, 32L4, 32L5, and 32L6 at the time of charging of the battery 30, the variation in the charging rate can be suppressed.

<Battery 30 and Battery Casing 31>

Figure 5:
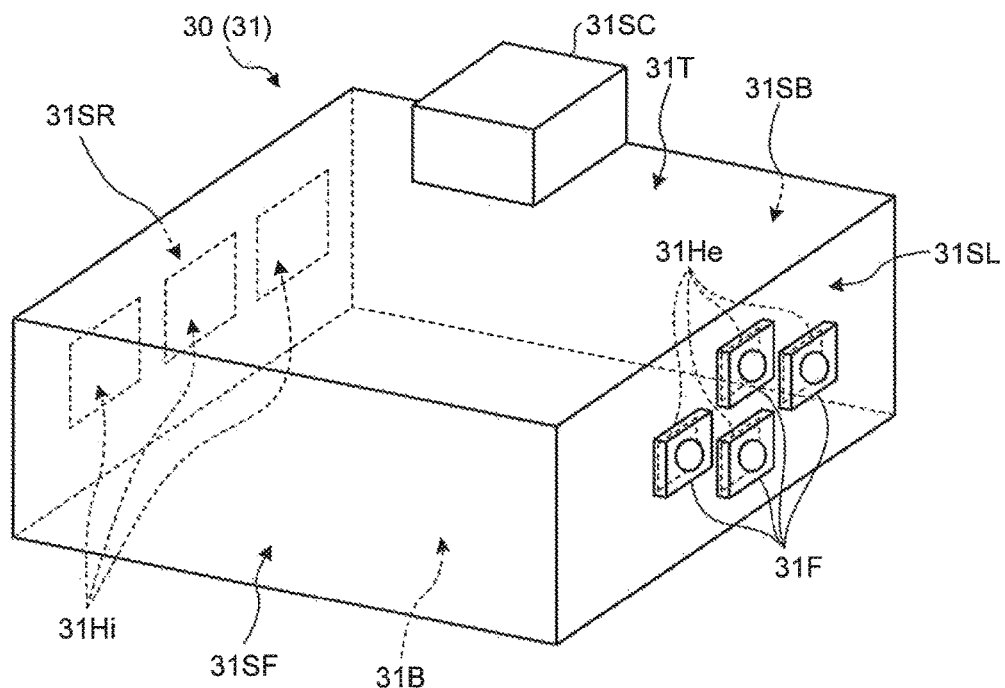
FIG. 5 is a perspective view illustrating a battery and a batter case according to the embodiment.
Figure 6:
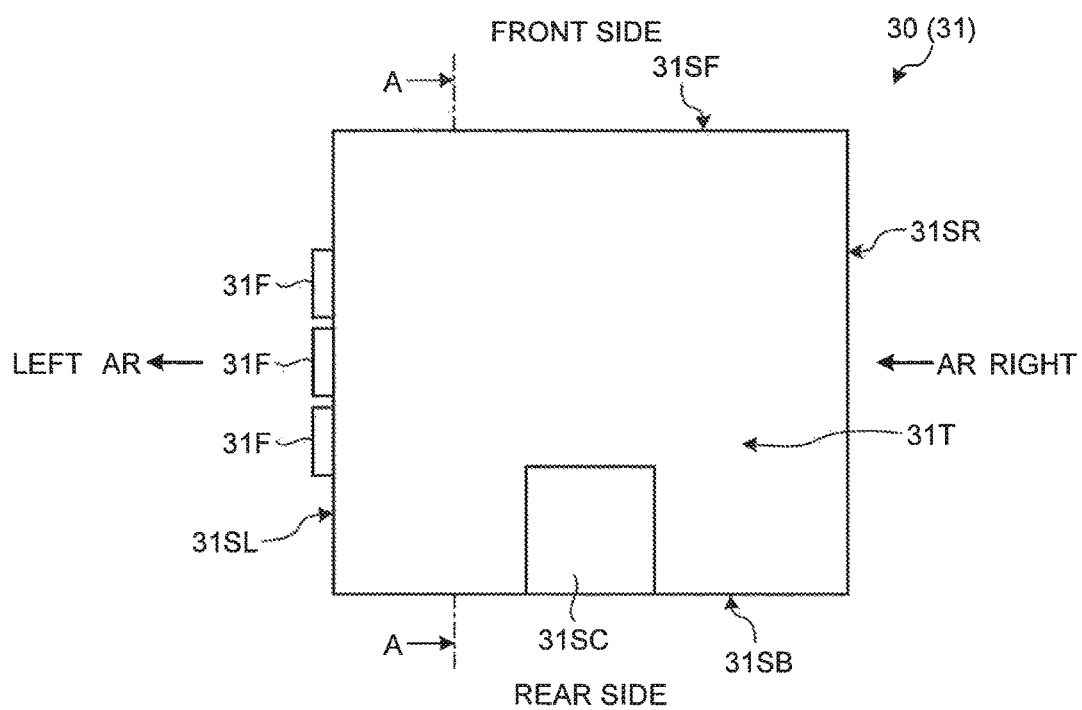
FIG. 6 is a plan view illustrating the battery and the battery casing according to the embodiment.
Figure 7:
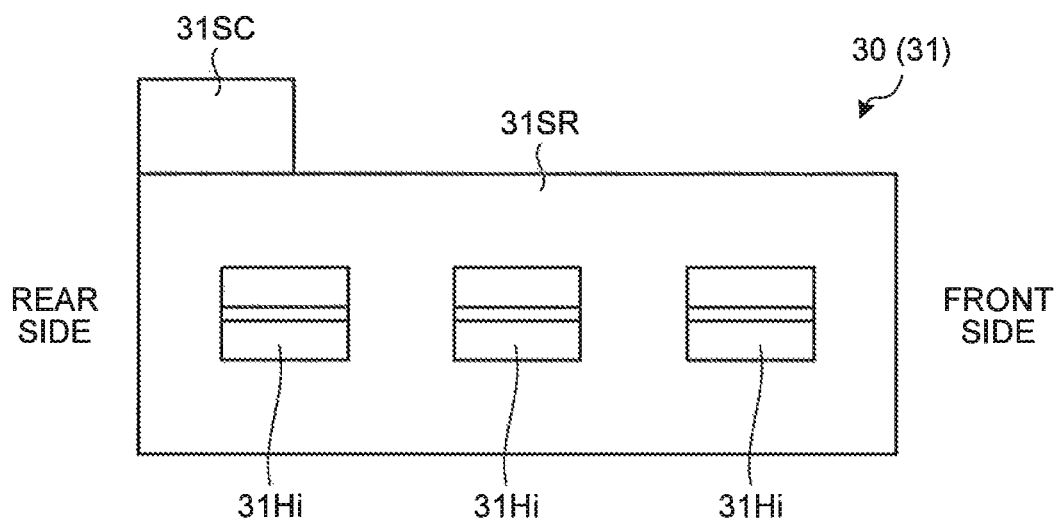
FIG. 7 is a right side view illustrating the battery and the battery casing according to the embodiment.
Figure 8:
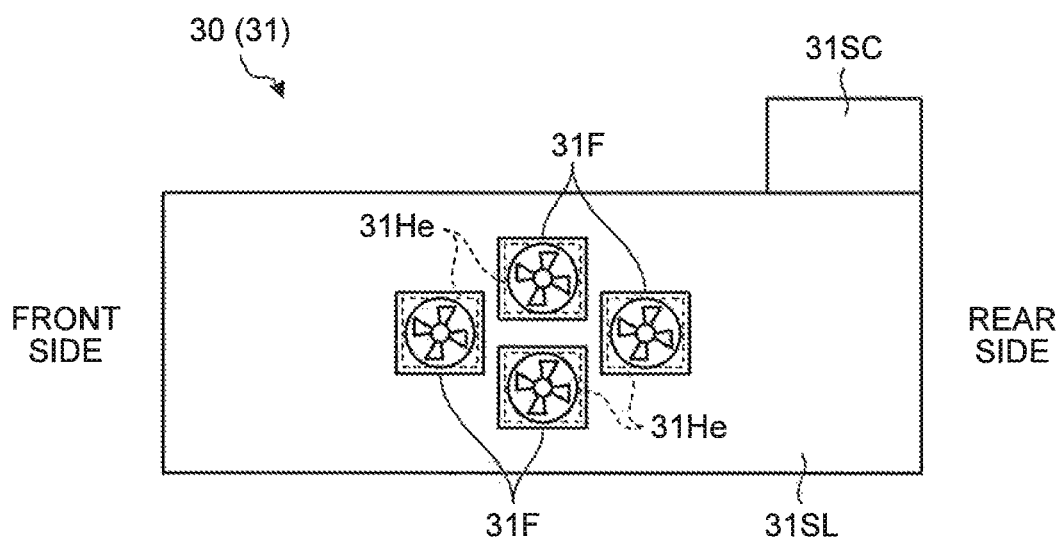
FIG. 8 is a left side view illustrating the battery and the battery casing according to the embodiment.

FIG. 5 is a perspective view illustrating a battery and a battery casing according to the embodiment. FIG. 6 is a plan view illustrating the battery and the battery casing according to the embodiment. FIG. 7 is a right side view illustrating the battery and the battery casing according to the embodiment. FIG. 8 is a left side view illustrating the battery and the battery casing according to the embodiment. The battery 30 is configured of the plurality of battery cells 32 which are stored in a battery casing 31. The battery casing 31 includes a bottom 31B, a top 31T facing the bottom 31B, and sides 31SF, 31SB, 31SL, and 31SR which connect the bottom 31B and the top 31T. The battery casing 31 stores the plurality of battery cells 32 in a space surrounded by the top 31T, the bottom 31B, and the sides 31SF, 31SB, 31SL, and 31SR such that at least some of the plurality of battery cells are caused to come into contact with each other on at least one side.

On the top 31T of the battery casing 31, a storage case 31SC is attached for storing a protection circuit. In the storage case 31SC, the above-mentioned fuses Fu1, Fu2, Fu3, Fu4, Fu5, and Fu6 and the contactor 66 illustrated in FIG. 4 are stored. The battery casing 31 is a cuboid structure as illustrated in FIG. 5. The top 31T, the bottom 31B, and the sides 31SF, 31SB, 31SL, and 31SR all are plate-shaped, rectangular (including square) members.

FIG. 6 illustrates a state of the battery 30 built in the battery-type forklift 1. As illustrated in FIG. 6, the battery 30 is disposed such that the side 31SF of the battery casing 31 faces the front and the side 31SB of the battery casing 31 faces the rear. Further, the battery 30 is disposed such that the side 31SL of the battery casing 31 faces the left side and the side 31SR of the battery casing 31 faces the right side. The front and the rear correspond to the front and the rear of the battery-type forklift 1 illustrated in FIGS. 2 and 3. In other words, when being built in the battery-type forklift 1, the battery 30 is disposed such that the side 31SF faces the front and the side 31SB faces the rear.

As illustrated in FIGS. 5 and 7, the side 31SR on the right side among the four sides 31SF, 31SB, 31SL, and 31SR includes inlet holes 31Hi through which the side itself is opened. The inlet holes 31Hi introduce gas into the battery casing 31. In the embodiment, the gas is the air. In the embodiment, the side 31SR has been described to have a plurality (three in the example) of inlet holes 31Hi, but the number of inlet holes is not limited thereto. As illustrated in FIGS. 5 and 8, the side facing the side 31SR opened through the inlet holes 31Hi among the four sides 31SF, 31SB, 31SL, and 31SR, that is, the side 31SL on the left side, includes outlet holes 31He through which the side itself is opened. The outlet holes 31He discharge the gas which has been introduced into the battery casing 31. In the embodiment, the side 31SL has been described to have the plurality (four in the example) of outlet holes 31He, but the number of outlet holes 31He is not limited thereto.

The battery casing 31 includes fans 31F. The fans 31F introduce the gas into the battery casing 31 through the inlet holes 31Hi to make the gas brought into contact with the upper and lower surfaces of the plurality of battery cells 32, and then discharges the gas from the inside of the battery casing 31. In the embodiment, the battery casing 31 has been described to have the plurality of fans (four in the example) of fans 31F. However, the number of fans 31F is not limited to four. The respective fans 31F are attached to the outlet holes 31He. With the structure, the plurality of fans 31F suck the gas from the inside of the battery casing 31 and discharges it to the outside. Since the fans 31F suck the gas from the inside of the battery casing 31, a stable flow of the gas from the inlet holes 31Hi toward the outlet holes 31He can be made in the battery casing 31.

When the plurality of fans 31F discharges the gas from the inside of the battery casing 31, the pressure in the battery casing 31 will be lowered in comparison with the outside. For this reason, the gas is introduced through the inlet holes 31Hi to the inside of the battery casing 31. In the embodiment, as illustrated with arrow AR of FIG. 6, the gas is introduced from the right side of the battery casing 31 to the inside, and then discharged to the left side. In this way, the plurality of battery cells 32 stored in the battery casing 31 are cooled.

In consideration of the relation with the vehicle body 10 of the battery-type forklift 1 illustrated in FIG. 2, the inlet holes 31Hi are disposed on one side in the width direction of the battery-type forklift 1, and the outlet holes 31He are disposed on the other side in the width direction. In the embodiment, the inlet holes 31Hi are disposed on the right side of the vehicle body 10, and the outlet holes 31He are disposed on the left side of the vehicle body 10. The gas is introduced from the right side of the vehicle body 10 to the inside of the battery casing 31, and then discharged to the left side. Since the fans 31F are attached to the outlet holes 31He, the fans 31F are disposed on the left side of the vehicle body 10. Therefore, it is possible to suppress an increase in dimension of the vehicle body 10 in the front and rear direction which may be caused by the fans 31F attached to the battery casing 31.

Figure 9:
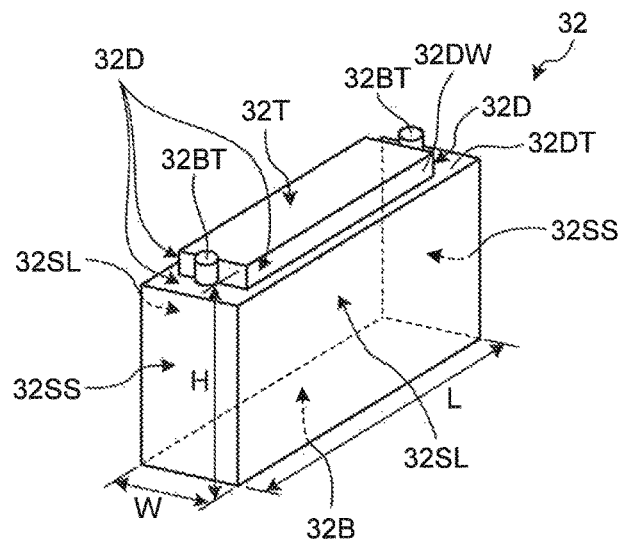
FIG. 9 is a perspective view illustrating an example of a battery cell which is included in the battery according to the embodiment.

FIG. 9 is a perspective view illustrating an example of the battery cell which is included in the battery according to the embodiment. The battery cell 32 has a cuboid shape. The battery cell 32 includes a top surface 32T having a rectangular shape in plan view where terminals 32BT are provided, a bottom surface 32B having a rectangular shape in plan view which faces the top surface 32T, and four side surfaces 32SL, 32SL, 32SS, and 32SS having a rectangular shape in plan view which connect the top surface 32T and the bottom surface 32B. The battery cell 32 is configured such that the distance H between the top surface 32T and the bottom surface 32B is longer than the dimension W of the short side of the top surface 32T.

In the bottom surface 32B, dimension W of the neighboring side having a rectangular shape in plan view is smaller than dimension L of the other side. The dimension W refers to the width of the battery cell 32, and the dimension L refers to the length of the battery cell 32. Further, the distance (the shortest distance) H between the top surface 32T and the bottom surface 32B refers to the height of the battery cell. In other words, the battery cell 32 has the height H larger than the width W. In the embodiment, the length L of the battery cell 32 is larger than the height H. In other words, the battery cell 32 is a rectangular structure of which the length L is the largest, the width W is the smallest, and the height H is in the middle of the both values. The area of each of the facing side surfaces 32SL and 32SL is larger than that of each of the facing side surfaces 32SS and 32SS. In the following, the side surfaces 32SL and 32SL will be appropriately referred to as the large side surfaces 32SL and 32SL, and the side surfaces 32SS and 32SS as the small side surfaces 32SS and 32SS.

The battery cell 32 includes a stepped portion 32D between the top surface 32T and each of the side surfaces 32SL, 32SL, 32SS, and 32SS adjacent to the top surface 32T. The stepped portion 32D includes a stepped top surface 32DT which is parallel to the top surface 32T and the bottom surface 32B and stepped side surfaces 32DW which are straightened up from the stepped top surface 32DT. In the embodiment, the stepped side surfaces 32DW are substantially perpendicular to the stepped top surface 32DT. The plurality of battery cells 32 are stored in the battery casing 31. Then, terminals 32B of the respective battery cells 32 are connected to the power cables. In the battery casing 31, the above-mentioned power cables are placed in the stepped portions 32D of the battery cells 32.

Figure 10:
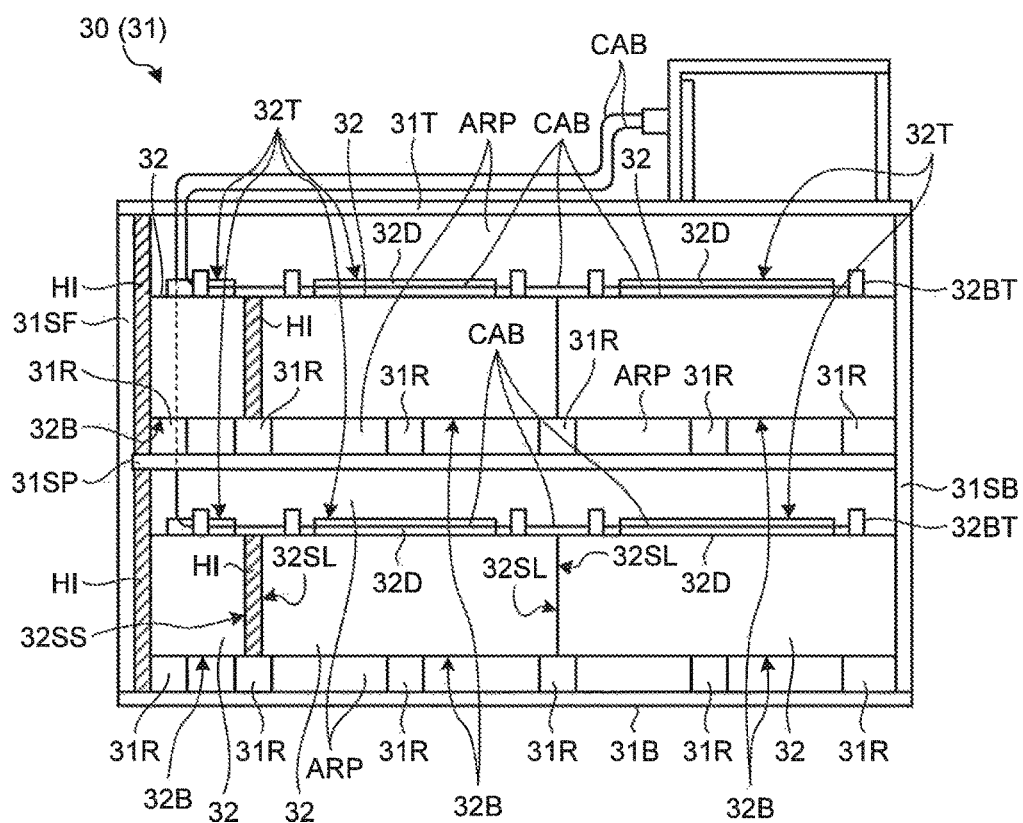
FIG. 10 is a diagram seen from arrow A-A of FIG. 6.
Figure 11:
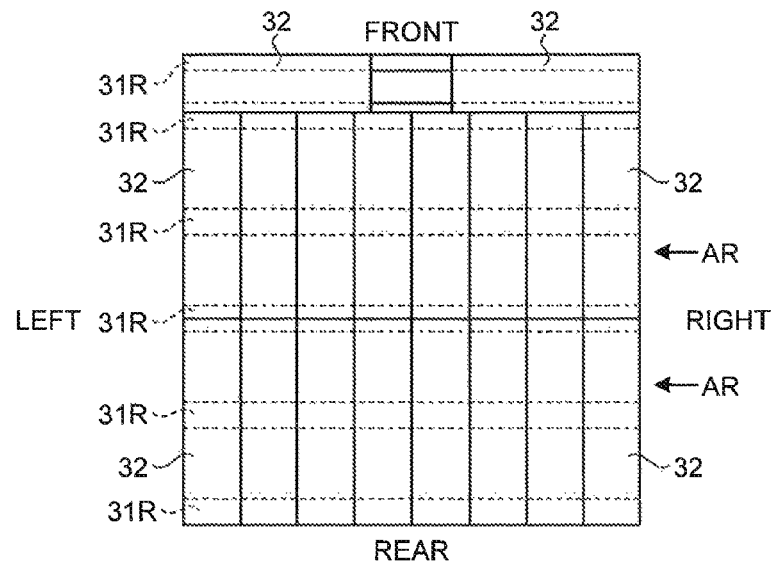
FIG. 11 is a diagram illustrating a relation between the battery casing and rails.
Figure 12:
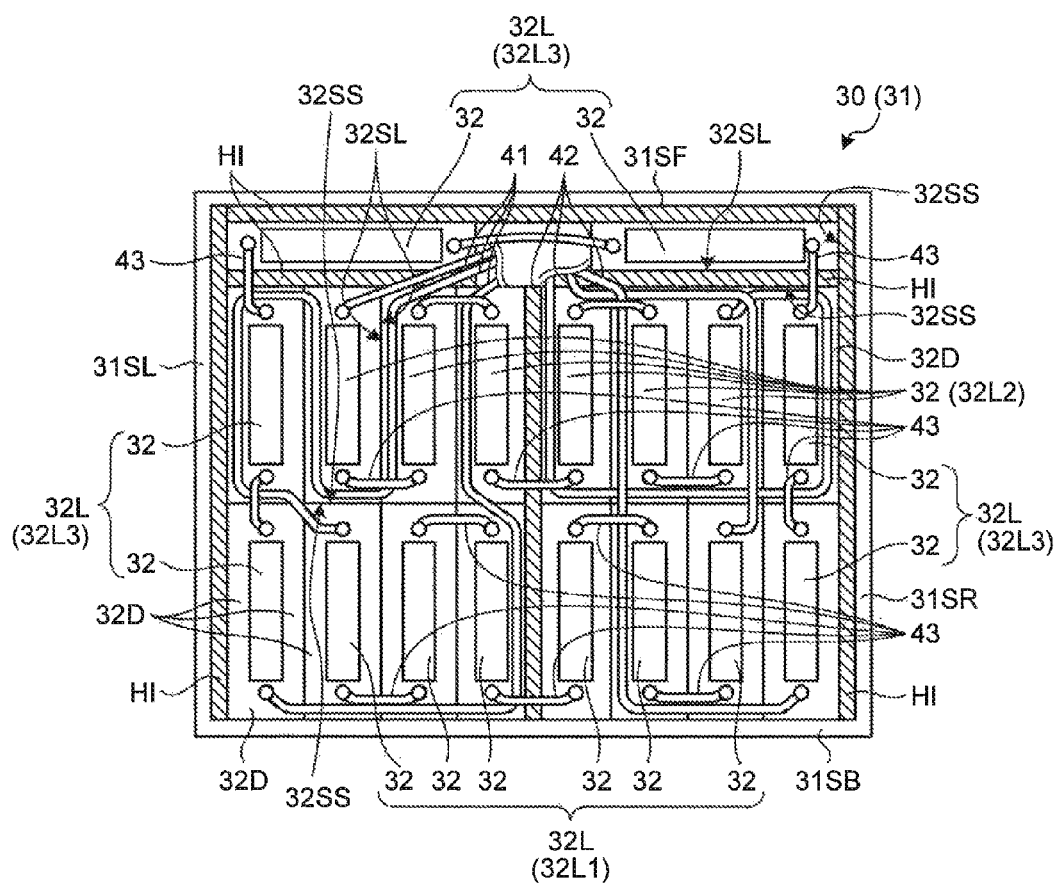
FIG. 12 is a plan view illustrating the battery casing of which the top is removed.

FIG. 10 is a diagram seen from arrow A-A of FIG. 6. FIG. 11 is a diagram illustrating a relation between the battery casing and rails. Arrow AR denoted in FIG. 11 illustrates the gas flow. FIG. 12 is a plan view illustrating the battery casing of which the top is removed. As illustrated in FIG. 10, in the embodiment, the battery casing 31 includes a partition member 31SP which partitions the inside of the battery casing 31 between the top 31T and the bottom 31B. The plurality of battery cells 32 are disposed between the top 31T and the partition member 31SP and between the partition member 31SP and the bottom 31B. The partition member 31SP is a plate-shaped member. The partition member 31SP has a rectangular (including square) shape in plan view. The partition member 31SP is disposed inside the sides 31SF, 31SB, 31SL, and 31SR of the battery casing 31.

The battery 30 includes a plurality of rails 31R as a plurality of rod-shaped members which extend from the inlet holes 31Hi toward the outlet holes 31He illustrated in FIGS. 5 and 7. The plurality of rails 31R are provided on the surface of the partition member 31SP facing the top 31T of the battery casing 31. Similarly, the plurality of rails 31R are provided on the surface of the bottom 31B of the battery casing 31 facing the top 31T of the battery casing 31. In the embodiment, the plurality of rails 31R are disposed such that the extending direction (the longitudinal direction) thereof is parallel to the right and left direction (the width direction) of the battery casing 31.

As illustrated in FIG. 10, the respective rails 31R come in contact with the bottom surface 32B of the battery cell 32 to support the battery cells 32. Since the plurality of rails 31R are provided between the bottom surfaces 32B of the battery cells 32 and the partition member 31SP and between the bottom surfaces 32B and the bottom 31B, gas passages ARP each are formed between the bottom surfaces 32B of the battery cells 32 and the partition member 31SP and between the bottom surfaces 32B and the bottom 31B for the ventilating of the gas. Further, the gas passages ARP each are formed also between the top 31T of the battery casing 31 and the top surfaces 31T of the plurality of battery cells 32 and between the partition member 31SP and the top surfaces 31T of the plurality of battery cells 32 for the ventilating of the gas.

With such a structure, the gas introduced from the inlet holes 31Hi into the battery casing 31 illustrated in FIGS. 5 and 7 flows in contact with the top and bottom surfaces 32T and 32B of the plurality of battery cells 32 disposed between the top 31T and the partition member 31SP, and with the top and bottom surfaces 32T and 32B of the plurality of battery cells 32 disposed between the partition member 31SP and the bottom 31B in the middle of passing through the gas passages ARP. In this way, the battery cells 32 are cooled down. Specifically, in a case where the battery 30 is charged in a boost mode, the respective battery cells 32 give off heat. Therefore, the flowing of the gas through the gas passages ARP causes the heat given off by the plurality of battery cells 32 to be released to the outside of the battery casing 31.

In the embodiment, the battery casing 31 includes four gas passages ARP. These gas passages ARP are preferably disposed such that the areas thereof perpendicular to the flow direction of the gas become equal. Since such a structure makes the amounts of gases flowing through the gas passages ARP equal, it is possible to suppress the variation in cooling among all the battery cells 32.

As illustrated in FIGS. 10 and 11, some of the rails 31R come into contact with the bottom surfaces 32B of two battery cells 32, and the others come into contact with the bottom surfaces 32B of one battery cell 32. The respective rails 31R extend from the inlet holes 31Hi toward the outlet holes 31He. For this reason, the plurality of rails 31R partition the gas passage ARP between the plurality of battery cells 32 and the partition member 31SP and the gas passage ARP between the plurality of battery cells 32 and the bottom 31B into a plurality of passages. With such a structure, the gas introduced from the inlet holes 31Hi into the battery casing 31 flows through the respective passages divided by the plurality of rails 31R. Therefore, it is possible to realize the uniform distribution of the gas in the direction perpendicular to the extending direction of the rails 31R. As a result, it is possible to suppress the variation in temperature among the plurality of battery cells 32.

As illustrated in FIG. 10, power cables CAB which are connected to the positive and negative electrodes of the respective battery cells 32 are disposed along with the top surfaces 32T of the respective battery cells 32. In this way, since it is possible to suppress the power cables CAB from floating from the top surface 32T of the battery cells 32, the power cables can be suppressed from protruding into the gas passages ARP in the battery casing 31. Therefore, the cross-sectional area of the gas passage ARP are suppressed not to be lowered, thereby suppressing a decrease in flow rate of the gas passing through the gas passage ARP. As a result, the decrease in cooling efficiency of the plurality of battery cells 32 provided in the battery 30 itself can be suppressed; moreover, the variation in temperatures between the plurality of battery cells 32 can be suppressed.

As described above, in the battery casing 31, the power cables CAB are placed in the stepped portions 32D of the battery cells 32. For this reason, a first line 41, a second line 42, and a third line 43, that is, power cables CAB in the battery casing 31, can be prevented from protruding into the gas passages ARP in the battery casing 31. As a result, since the battery 30 is configured to suppress a decrease in flow rate of the gas passing through the gas passages ARP, it is possible to suppress a decrease in cooling efficiency of the plurality of battery cells 32 provided in the battery itself and the variation in temperature.

In the embodiment, for example, as illustrated in FIG. 11, at least parts of the large side surfaces 32SL of eight battery cells 32 each are in contact to form columns (hereinafter, appropriately referred to as a cell column) of the battery cells 32. In the battery casing 31, the cell columns are disposed in two rows. Each cell column is disposed such that at least parts of the small side surfaces 32SS of the battery cells 32 are in contact. Further, two battery cells 32 are closely disposed to one cell column in the battery casing 31. The respective battery cells 32 are disposed such that at least a part of the respective large side surfaces 32SL is close to at least a part of the small side surfaces 32SS of the plurality of battery cells 32 included in one cell column.

The battery cells 32 which are disposed on both end sides of the cell columns are arranged such that the large side surfaces 32SL only on one side come in contact with the large side surface 32SL of the adjacent battery cells 32, and the large side surfaces 32SL on the other side face any one of the sides 31SL and 31SR of the battery casing 31. Two battery cells 32 of which the large side surfaces 32SL come in contact with one cell column are disposed such that the large side surfaces 32SL not in contact with the small side surfaces 32SS face the side 31SF of the battery casing 31, and one of the small side surfaces 32SS faces any one of the sides 31SL and 31SR of the battery casing 31. Further, in the two battery cells 32, the small side surfaces 32SS not facing the sides 31SL and 31SR face each other.

FIG. 12 illustrates the arrangement of the plurality of battery cells 32 provided on the upper portion of the above-mentioned partition member 31SP. The upper portion of the bottom 31B of the battery casing 31 also has a plurality of battery cells 32 disposed thereon similarly to the upper portion of the partition member 31SP. In the embodiment, since total 18 battery cells 32 are disposed on the upper portion of the partition member 31SP, total 36 battery cells 32 are disposed in the battery casing 31. As described above, the battery 30 is configured such that six battery cells 32 are connected in series to form one battery cell group 32L, and the plurality (six in this embodiment) of battery cell groups 32L are connected in parallel. In the embodiment, the six battery cells 32 except the two battery cells 32 disposed on both end sides of the one cell column form one battery cell group 32L. Further, total six battery cells, that is, four battery cells 32 disposed on both end sides of the respective cell columns and two battery cells 32 of which the large side surfaces 32SL come in contact with the one cell column, form one battery cell group 32L.

In the embodiment, as illustrated in FIGS. 10 and 12, heat insulating materials HI are provided between the plurality of battery cells 32 and the inner sides 31SF of the battery casing 31. The heat insulating materials HI come in contact with the battery cells 32 and the sides of the battery casing 31. Further, the heat insulating materials HI are provided between some battery cells 32. The heat insulating materials HI suppress the heat of the battery cells 32 from being transmitted to the outside of the battery casing 31. In this way, the variation in temperatures of the battery cells 32 can be suppressed. In this way, since the variation in temperatures of the battery cells 32 at the time of charging is suppressed in particular, the variation in the charging rate and the decrease in durability of the battery cells 32 are effectively suppressed. Further, the heat insulating materials HI can serve to suppress the battery cells 32 not to move in the battery casing 31. Furthermore, in cases such that the battery-type forklift 1 makes a sudden start or a sudden stop, an impact applied on the battery cells 32 can also be alleviated.

The fans 31F are controlled by the in-vehicle controller 60 illustrated in FIG. 2. In the embodiment, the in-vehicle controller 60 makes a control such that the gas is sucked from the inside of the battery casing 31 to cool down the plurality of battery cells 32 during a period when the plurality of battery cells 32 provided in at least battery 30 are being charged. In this way, since the variation in temperature of the respective battery cells 32 can be suppressed at the time of charging, the variation in the charging rate and the decrease in durability of the battery cells 32 are effectively suppressed. In the embodiment, the in-vehicle controller 60 can also make a control such that the gas is sucked from the inside of the battery casing 31 to suppress the battery cells 32 from being warmed up during a period when the plurality of battery cells 32 provided in the battery 30 are being discharged.

Figure 13:
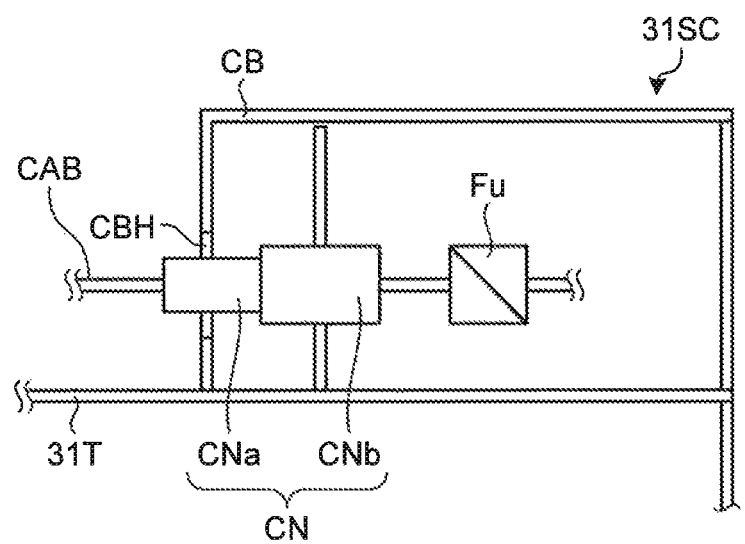
FIG. 13 is a diagram illustrating the structure of a storage case.

FIG. 13 is a diagram illustrating the structure of the storage case. The storage case 31SC stores the fuses Fu therein. The fuses Fu correspond to the fuses Fu1, Fu2, Fu3, Fu4, Fu5, and Fu6 illustrated in FIG. 4. The fuses Fu are electrically connected to the terminals 32BT of the battery cells 32 through the power cables CAB. The power cables CAB drawn from the plurality of battery cell groups 32L and the fuses Fu are connected by connectors CN. The connector CN includes a first connector CNa and a second connector CNb. The power cable CAB is connected to the first connector CNa, and the fuse Fu is connected to the second connector CNb. The second connector CNb is attached to the storage case 31SC.

The storage case 31SC is attached with the cover CB. The cover CB includes an opening CBH through which the first connector CNa passes. The first connector CNa passes the opening CBH and is plugged into the connector CNb. The cover CB needs to be removed in a case where the cover CB is removed for inspecting the inside of the storage case 31SC. When the cover CB is removed in a state where the first connector CNa is connected to the second connector CNb, the first connector CNa is engaged with the opening CBH of the cover CB. Therefore, the cover CB cannot be removed as long as the first connector CNa is not removed from the second connector CNb. When the first connector CNa is removed from the second connector CNb, the cover CB can be removed. When the first connector CNa is removed from the second connector CNb, the electric power from the battery cells 32 is not applied to the fuses Fu. Therefore, there is no danger even when the components in the storage case 31SC are touched.

In the embodiment, the first connector CN is provided in the opening CBH formed in the cover CB of the storage case 31SC for the connection to the power cables CAB of the battery cells 32. With such a structure, the cover CB cannot be removed as long as the first connector CNa is not removed from the second connector CNb, thereby improving the safety.

As illustrated in FIG. 6, the storage case 31SC is provided on the back side of the battery casing 31. With respect to the relation with the vehicle body 10 of the battery-type forklift 1 illustrated in FIG. 2, the storage case 31SC is provided on the back side of the vehicle body 10. The battery 30, as illustrated in FIG. 2, is provided under the driver seat 34 of the battery-type forklift 1. When the cover CB of the storage case 31SC is removed for the exchanging of the fuses Fu or the like, as illustrated in FIG. 2, the driver seat 34 is made to rotate about the center of a support shaft 33a to release the top of the battery 30. At this time, since the storage case 31SC is provided on the back side of the vehicle body 10, the storage case 31SC of the work vehicle can be easily accessed. Therefore, the exchanging of the fuses Fu or the inspection of the storage case 31SC can be easily performed.

The battery casing 31 is configured such that the variation in temperature of the battery cells 32 at the time of charging can be suppressed by the heat insulating materials HI and the fans 31F. Therefore, the variation in the charging rate and the decrease in durability of the battery cells 32 are effectively suppressed. For this reason, the in-vehicle controller 60 illustrated in FIG. 2 will no longer be necessary to make a parallel control at the time of charging the battery 30, and thus the control can be simple at the time of charging. A parallel control refers to a control in which a charging volume is regulated to make the charging volume equalized in each battery cell in a case where a battery having the plurality of battery cells connected in parallel is charged. In a case where the battery cells 32 are cooled down using the fans 31F, it is preferable to provide a gap between the adjacent battery cells 32. However, the gap will cause an increase in dimension of the battery casing 31. Since the battery-type forklift 1 is required to have an ability to turn in a small radius, the vehicle body 10 is preferably made as compact as possible. Further, since the battery-type forklift 1 stores the battery 30 under the driver seat 34, when the gap is provided between the battery cells 32, there may not be stored with an enough quantity of the battery cells 32 that the forklift needs.

Therefore, in the embodiment, the battery cells 32 forming a cell column are stored in the battery casing 31 in a state where at least ones of four side surfaces 32SL, 32SL, 32SS, and 32SS are intentionally brought into contact with each other at least partially, battery casing. In this way, since there is no need to provide the gap between the battery cells 32, it is possible to suppress an increase in dimension of the battery casing 31. Then, the gas flows in contact with the top and bottom surfaces 32T and 32B of the battery cells 32, thereby cooling down the respective battery cells 32. In this way, the battery 30 can be realized to suppress an increase in dimension and to secure the cooling of the battery cells 32 at the same time.

In the embodiment, the battery casing 31 may not be provided with the partition members 31SP. In other words, the plurality of battery cells 32 may be disposed in only one stage between the top 31T and the bottom 31B rather than the respective stages on both sides of the top 31T and the bottom 31B. Further, the plurality of fans 31F may blow the gas into the battery casing 31 instead of sucking the gas from the inside of the battery casing 31.

In a case where the battery 30 is charged in the boost mode using the charging apparatus 2, heat values of an AC/DC conversion apparatus and the like increase compared with those in a normal charging, so that the apparatus increases in size. In a case where the charging apparatus capable of being charged in the boost mode is built in the battery-type forklift 1, the mass will increase in addition that the battery-type forklift 1 itself increases in size. Therefore, the running hours of the battery-type forklift 1 may be shortened. In the embodiment, since the charging apparatus 2 is a stationary type, the charging apparatus capable of being charged in the boost mode is not necessarily built in the battery-type forklift 1. As a result, it is possible to perform the management on the battery 30 while suppressing the battery-type forklift 1 from being large and the running hours from being shortened due to the increased mass.

Here, a case will be considered in which the stationary charging apparatus 2 is used, a maintenance center manages the battery 30 through a communication manner to prevent defects attributable to the battery 30 for the preservation of it. In this case, the charging apparatus 2 is also necessarily built with a communication apparatus. In the embodiment, the in-vehicle controller 60 illustrated in FIG. 2 controls the charging apparatus 2, and collects information about the charging such as the charging conditions of the battery 30 and a failure in connection between the charging connector 23 and the charging-apparatus-side connector 24. Then, the in-vehicle controller 60, for example, can transmit the information about the battery 30 to the maintenance center using a communication apparatus built in the battery-type forklift 1. In this way, the battery-type forklift 1 is configured such that the in-vehicle controller makes a control on the charging of the battery 30 and collects the information about the battery 30. Therefore, the battery 30 can be managed using the communication apparatus for the communication with a base station outside the vehicle, and the defects attributable to the battery 30 can be prevented for the preservation of it. As a result, there is no need to build the communication apparatus in the charging apparatus 2.

In a case of the management of the battery 30, the in-vehicle controller 60 illustrated in FIG. 2 collects, for example, a charging frequency, a full charging frequency, a total discharging amount, a charging or discharging period, and the like as information for the management, and transmits the collected information to the maintenance center through the communication apparatus. In a case of the management of the defects attributable to the battery 30, the in-vehicle controller 60 collects, for example, a history of errors and transmits the history to the maintenance center through the communication apparatus. In a case of the prevention of the defects attributable to the battery 30, the in-vehicle controller 60 collects, for example, a history of failures of the charging attributable to the connection error between the charging connector 23 and the charging-apparatus-side connector 24, and transmits the history to the maintenance center through the communication apparatus.

Hereinbefore, the descriptions have been made about the embodiment, but the above-mentioned descriptions do not limit the embodiment. Further, the above-mentioned components include those capable of being conceived by a person skilled in the art, those substantially equal to the descriptions, and those belonging to a range of so-called equivalents. Furthermore, the above-mentioned components may be formed by a combination thereof. In addition, various omissions, substitutions, or modifications of the components can be made without departing from the scope of the embodiment.

REFERENCE SIGNS LIST

1 BATTERY-TYPE FORKLIFT
2 CHARGING APPARATUS
6 AC POWER SUPPLY
10 VEHICLE BODY
13 FORK
23 CHARGING CONNECTOR
24 CHARGING-APPARATUS-SIDE CONNECTOR
30 BATTERY
31 BATTERY CASING
31F FAN
31B BOTTOM
31Hi INLET HOLE
31SP PARTITION MEMBER
31B BOTTOM
31R RAIL
31T TOP
31SF SIDE
31He OUTLET HOLES
32 BATTERY CELL
32B BOTTOM SURFACE
32SL SIDE SURFACE (LARGE SIDE SURFACE)
32SS SIDE SURFACE (SMALL SIDE SURFACE)
32T TOP SURFACE
32BT TERMINAL
34 DRIVER SEAT
HI HEAT INSULATING MATERIAL

The invention claimed is:

1. A battery that supplies electric power to a battery-driven work vehicle, the battery comprising:
a plurality of battery cells each of which includes a top surface, a bottom surface facing the top surface, and four side surfaces connecting the top surface and the bottom surface;
a battery casing, which includes a bottom, a top facing the bottom, sides connecting the bottom and the top, and a partition member placed between the top and the bottom to partition an inside of the battery casing, and stores the plurality of battery cells between the top and the partition member and between the partition member and the bottom;
an inlet hole which is open to any one of the side surfaces to introduce a gas into the battery casing;
an outlet hole which is open to another side surface facing the one of the side surfaces to which the inlet hole is open, and discharges the gas from the inside of the battery casing;
a fan which introduces the gas from the inlet hole into the battery casing to make the gas flow in contact with the top and bottom surfaces of the plurality of battery cells, and then discharges the gas from the inside the battery casing; and
a plurality of rod-shaped members which are extended from the inlet hole to the outlet hole, and which separate a gas passage formed below the bottom surface of each battery cell and above the bottom of the battery casing into a plurality of passages and separate another gas passage formed below the bottom surface of each battery cell and above the partition member into another plurality of passages.

2. The battery according to claim 1,
wherein a heat insulating material is provided between the side of the battery casing and one of the battery cells.

3. The battery according to any claim 1,
wherein the fan is provided on a side of the outlet hole, and sucks the gas from inside of the battery casing during at least a period when the plurality of battery calls are charged.

4. The battery according to claim 3,
wherein the fan sucks the gas from the inside of the battery casing even during a period when the plurality of battery cells are discharged.

5. The battery according to claim 1, further comprising a storage case which is provided on an outside of the top of the battery casing to store a fuse which is electrically connected with one of the battery cells.

6. A battery-driven work vehicle comprising
a battery that supplies electric power to the battery-driven work vehicle, the battery comprising:
a plurality of battery cells each of which includes a top surface, a bottom surface facing the top surface, and four side surfaces connecting the top surface and the bottom surface;
a battery casing, which includes a bottom, a top facing the bottom, sides connecting the bottom and the top, and a partition member between the top and the bottom to partition an inside of the battery casing and stores the plurality of battery cells between the top and the partition member and the partition member and the bottom;
an inlet hole which is open to any one of the side surfaces to introduce a gas into the battery casing;

an outlet hole which is open to another side surface facing the one of the side surfaces to which the inlet hole is open, and discharges the gas from the inside of the battery casing;

a fan which introduces the gas from the inlet hole into the battery casing to make the gas flow in contact with the top and bottom surfaces of the plurality of battery cells, and then discharges the gas from the inside the battery casing; and a plurality of rod-shaped members which are extended from the inlet hole to the outlet hole, and which separate a gas passage formed below the bottom surface of each battery cell and above the bottom of the battery casing into a plurality of passages and separate another gas passage formed below the bottom surface of each battery cell and above the partition member into another plurality of passages.

7. The battery-driven work vehicle according to claim 6, wherein the inlet hole is disposed on one side of the work vehicle in a width direction, and wherein the outlet hole is disposed on another side thereof opposite to the one side of the work vehicle in the width direction.

8. The battery-driven work vehicle according to claim 6, wherein the battery for the work vehicle is disposed under a battery hood of the work vehicle.

9. The battery-driven work vehicle according to claim 6, wherein the battery hood rotates about a predetermined shaft in a front of the battery-driven work vehicle, and wherein a storage case which is provided on an outside of the top of the battery casing to store the fuse which is electrically connected to a terminal is provided on a back side of the battery-driven work vehicle.

* * * * *